(12) United States Patent
Coyle

(10) Patent No.: US 7,907,333 B2
(45) Date of Patent: Mar. 15, 2011

(54) OPTICAL SOURCE AND APPARATUS FOR REMOTE SENSING

(75) Inventor: Donald Barry Coyle, Ellicott City, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 512 days.

(21) Appl. No.: 11/460,482

(22) Filed: Jul. 27, 2006

(65) Prior Publication Data

US 2007/0024956 A1 Feb. 1, 2007

Related U.S. Application Data

(60) Provisional application No. 60/704,245, filed on Jul. 27, 2005.

(51) Int. Cl.
*H01S 3/00* (2006.01)

(52) U.S. Cl. .............................. 359/333; 356/4.1; 356/5

(58) Field of Classification Search .................. 359/333; 356/4.1, 5
See application file for complete search history.

(56) References Cited

U.S. PATENT DOCUMENTS

| 5,847,817 | A * | 12/1998 | Zediker et al. | 356/5.09 |
| 6,850,487 | B2 * | 2/2005 | Mukherjee et al. | 370/225 |
| 2002/0075472 | A1 * | 6/2002 | Holton | 356/4.01 |
| 2007/0115541 | A1 * | 5/2007 | Rogers et al. | 359/345 |

* cited by examiner

*Primary Examiner* — Mark Hellner
(74) *Attorney, Agent, or Firm* — Christopher Edwards

(57) ABSTRACT

An optical amplifier is configured to amplify an injected seed optical pulse. The optical amplifier may include two or more gain sections coupled to form a continuous solid waveguide along a primary optical path. Each gain section may include: (i) an optical isolator forming an input to that gain section; (ii) a doped optical fiber having a first end coupled to the optical isolator and having a second end; (iii) a plurality of pump laser diodes; (iv) a controller providing drive signals to each of the plurality, the controller being configured to provide at least pulsed drive signals; and (v) an optical coupler having a first input port coupled to the second end, and a second input port coupled to the plurality and an output port.

10 Claims, 2 Drawing Sheets

OPTICAL SOURCE AND APPARATUS FOR REMOTE SENSING

CROSS REFERENCE TO RELATED APPLICATION

Priority is claimed under 35 U.S.C. 119(e) from U.S. Provisional Application 60/704,245 filed on Jul. 27, 2005.

ORIGIN OF THE INVENTION

The invention described herein was made by employees of the United States Government, and may be manufactured and used by or for the Government for governmental purposes without the payment of any royalties thereon or therefor.

FIELD OF THE INVENTION

This disclosure relates generally to optical amplifiers, in particular to optical sources and apparatus for remote sensing, and more particularly, to techniques for realizing high efficiency, electronically controllable optical sources for coherent radiation.

BACKGROUND

Many remote sensing apparatus rely on transmission of energy towards a surface or terrain to be probed, followed by subsequent reception of energy reflected therefrom, in order to realize maps of terrain, vegetation or surface topography. In many applications, optical sources may find utility in this field of endeavor. Vehicles may be used for bearing the remote sensing apparatus and for traversing the area of study. Ground penetrating radar, various types of other radars and remote sensing devices, gravitometers and other kinds of tools have been employed, in conjunction with other types of apparatus and measurement instruments, and have been used in a broad variety of applications for surface and subsurface characterization.

Each of these tools may present advantages for particular situations, may have technological limitations, may require set-up and analysis time and can include risks and associated costs. As a result, a cost-benefit analysis that may reflect the particular aspects of interest may also favor coordination of multiple instrument types, including optically-based measurement techniques. Of the various types of remote sensing devices, lidars (instruments employing light detection and ranging) find particular utility in broad area mapping employing aircraft or spacecraft as platforms, generally providing data that may be integrated with data from other types of guidance, posture-sensing and position-sensing equipment that track path, pitch, yaw, velocity and the like associated with vehicle or platform. Lidar may provide high accuracy data by scanning a laser beam in a direction generally transverse to a trajectory of the vehicle, and senses angle from nadir, intensity via analysis of pulses of optical energy reflected from the surface under study.

However, systems used to date as illumination sources for lidars may employ multiple discrete optical elements which must be assembled and aligned under conditions of extreme cleanliness where the alignment involves highly precise coordination of the elements forming the system. Additionally, particulate contamination of any of the surfaces between media in such systems may tend to give rise to catastrophic failure of the system. Such precisely-aligned optical systems may be susceptible to mechanical misalignment due to temperature-induced changes in dimensions of the various elements and/or also due to vibration. These may not be trivial concerns, particularly in applications where the unit is not readily field-serviceable following deployment, and/or in environments subject to relatively high vibration amplitudes, high thrust and/or extreme temperature excursions, such as space-based applications.

Further, the types of pulsed illumination sources utilized in these areas of endeavor may have typically included open cavity laser systems, which typically have relatively low electro-optical conversion efficiencies and which do not provide much latitude with respect to wavelength or other characteristics of the output energy. These types of lasers may be susceptible to thermally-induced warpage, and may be vulnerable to contamination, as well as unwanted vibration-related effects. For at least these reasons, the useful life of lasers previously employed in these types of applications suffers limitations, for example in the million shot range, at best.

Several factors may influence imaging performance of systems employing lidar for mapping. For example, relatively low propagation loss of the probe beam through the intervening space is but one of several factors influencing choice of wavelength for such a system. Another aspect involves the post-return-signal reception processing. In part due to limitations in processor speed, and in part for reasons of discriminating between various return or reflected signals, pulsed laser having repetition rates in a range of up to about ten kiloHertz may be used for remote imaging deployment. In general, remote sensing systems operate in a range where no more than two optical pulses may be provided during an interval starting with pulse transmission and ending with pulse reception, and thus a time difference ("T") between pulses of twice the distance separating the measurement system from the target ("D") multiplied by the velocity of light ("c"), or $(2*D)*c \leq T$, may be determined. As a result, the altitude D above the surface to be mapped may determine a maximum practical repetition rate for the optical pulses being employed. For example, in a scenario involving orbital ranging for characterizing and mapping planetary surfaces at an altitude of several hundred kilometers, pulse repetition rates may be limited to several hundred pulses per second. At closer ranges, of tens of kilometers or less, repetition rates may be as much as several thousand pulses per second. As a result, it may be necessary to employ pulsed optical sources for such systems.

More rapid modulation rates, such as are used in optical amplifiers for fiber-based information and telecommunication systems, generally may require continuously pumped optical sources, and, in turn, the lower repetition rates useful in mapping applications do not favor extremely wide bandwidth modulation applied to the optical signal. Wide bandwidth modulation has been a primary concern with respect to fiber-based optical amplifiers for communications system applications, and that arena has been a focus with respect to development of fiber-based laser amplifiers to date. Illumination sources employed in past provided very narrow gain-bandwidth characteristics, and hence were not amenable to tuning, or employed relatively fixed-frequency stabilizing elements that may include characteristics not amenable to compensation when the resultant luminance fails to match the passband characteristics of the data receiver. At the same time, the rate at which present-day equipment can process data from the photodetector may limit practical pulse rates to frequencies up to tens of kiloHertz.

Solid state laser diodes may provide relatively straightforward electro-optical modulation and control capabilities through control of the electrical signals used to drive them.

Such laser diodes may also provide mechanically robust illumination sources and do not suffer some of the temperature sensitivities and other performance disadvantages that some gas lasers using open optical cavities suffer. As solid state laser sources have become more robust, with increasing power and wavelength capabilities, the range of applications for which such laser diodes provide attractive characteristics has also increased.

However, these types of lasers do not provide sufficient power per pulse to be used for aerial mapping, unless some form of optical amplifier is provided in order to boost the energy per pulse. In turn, the power levels required, when achieved via conventional optical amplification systems, also present known nonlinear effects degrading system performance, such as amplified spontaneous emission (ASE), frequency shifting (optical frequency doubling), spontaneous mode-locking, longitudinal mode beating and thermally-induced lensing, among other phenomena. At sustained high operating power densities, melting or other catastrophic failure of the optical fiber or other optical elements may tend to limit the useful lifetime of such laser and amplifier systems to roughly a few seconds of operational life.

A significant result of technological innovations in laser diode sources and in optical amplifiers is that the potential and capability for real-time mapping of topography using systems from airborne platforms may be enhanced, where the systems have increased immunity to conventional infirmities. As a result, these capabilities represent strong impetus to incorporate new types of optical sources in lidar-based measurement systems adapted for airborne platform deployment.

In addition to lifetime limitations, optical sources for such systems that have been employed in past also have suffered limitations in flexibility and adaptability of parameters affecting operating characteristics of the system as a whole. These parameters may include capability for wavelength diversity, pulse shape and modulation rate or pulse shape/duration, among others. Typically, any in-situ change in any of these parameters may affect the others, thus greatly limiting the adaptability of a lidar instrument to a specific application or narrow range of target reflectivity and distance.

For reasons stated herein, there are needs in the art to provide more robust optical sources in order to increase useful life of laser light sources intended for laser-based metrology and mapping, while also increasing the performance latitude achievable via employment of such light sources.

SUMMARY

The above-mentioned shortcomings, disadvantages and problems are addressed herein, which will be understood by reading and studying the following disclosure.

In one embodiment, a system for remote sensing and mapping is disclosed wherein the system may include one or more processors; an illumination source controller and modulator coupled to the one or more processors; a pulsed illumination source coupled to the illumination source controller and modulator; a receiver having a capability for detecting illumination transmitted by the illumination source and providing signals based on detected illumination; and an image reconstruction engine coupled to the receiver and to the one or more processors, the image reconstruction engine processing signals from the receiver and employing characteristics of the signals to create a mapping corresponding to delay and reflectivity assessments based on the signals; the pulsed illumination source comprising: a seed coupled to the illumination source controller and modulator and accepting control and modulation signals therefrom; and an optical amplifier having an input coupled to the seed and having an output.

In another embodiment, an optical amplifier may be configured to amplify an injected seed optical pulse. The optical amplifier may include two or more gain sections coupled to form a continuous solid waveguide along a primary optical path. Each gain section may include: (i) an optical isolator forming an input to that gain section; (ii) a doped optical fiber having a first end coupled to the optical isolator and having a second end; (iii) a plurality of pump laser diodes; (iv) a controller providing drive signals to each of the plurality, the controller being configured to provide at least pulsed drive signals; and (v) an optical coupler having a first input port coupled to the second end, a second input port coupled to the plurality and an output port.

In yet another embodiment, a ruggedized pulsed laser system may include a modulator module configured to provide pulsed electrical signals, and a solid-state seed source coupled to the modulator module. The solid-state seed source may be configured to operate, responsive to the pulsed electrical signals, in a pulse mode using a repetition rate in a range spanning at least from a single-shot mode to about ten kiloHertz. The ruggedized pulsed laser system may also include an optical fiber amplifier coupled to the seed source and configured to operate in at least a pulsed mode. The optical fiber amplifier may include solid state pumps.

Systems and illumination sources of varying scope are described herein. In addition to the aspects and advantages described in this summary, further aspects and advantages will become apparent by reference to the drawings and by reading the detailed description that follows.

DETAILED DESCRIPTION

In the following detailed description, reference is made to the accompanying drawings that form a part hereof, and in which are shown, by way of illustration, specific embodiments, which may be practiced. These embodiments are described in sufficient detail to enable those skilled in the art to practice the embodiments, and it is to be understood that other embodiments may be utilized, and that logical, mechanical, electrical and other changes may be made, without departing from the scope of the embodiments. Ranges of parameter values described herein are understood to include all subranges falling therewithin. The following detailed description is, therefore, not to be taken in a limiting sense.

I. System Overview

Figure 1:
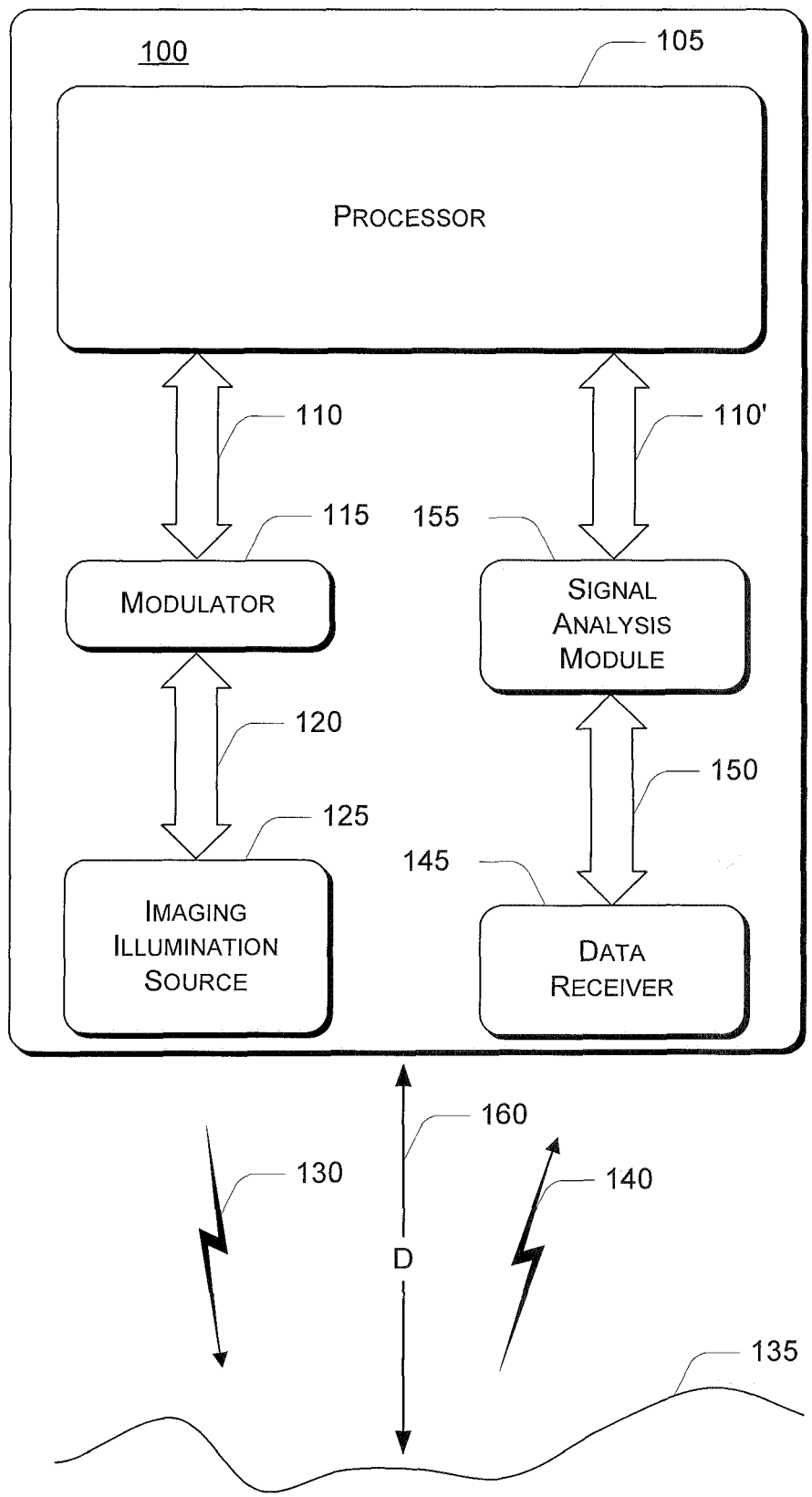
FIG. 1 shows a simplified block diagram of an overview of a remote sensing system configured to employ radiated and reflected probe signals.

FIG. 1 is a simplified block diagram of an overview of a remote sensing system 100 configured to employ radiated and reflected probe signals. The system 100 may include a processor 105, buses 110, 110', a modulator module 115 coupled to the processor 105 via the bus 110, and an interconnection 120 coupling the modulator to an imaging illumination source 125. A probe beam 130, such as a pulse from the imaging illumination source 125, may be directed towards a surface 135 to be characterized or mapped, and a reflected pulse 140 may be depicted en route from the surface 135 towards a data receiver 145, which provides signals responsive to the reflected pulse 140. An interconnection 150 may couple signals from the data receiver 145 to a signal analysis module 155, which, in turn, may be coupled via the bus 110' to the processor 105, which forms at least a portion of an image analysis or image reconstruction engine. In order to produce an image, some form of, e.g., two-dimensional, optical scanning mechanism may be employed. In one embodiment, repeated paths of the aircraft or spacecraft over or near the target area may be employed to produce laser spot grids and overlaps for forming an image. It may be appreciated that one or more of the elements shown in FIG. 1 may be implemented as a portion of software and hardware comprising the processor 105.

FIG. 1 also illustrates an average distance D 160 separating the system 100 from the surface 135 to be mapped. In airborne and spaceborne applications for systems 100, the average expected distance 160, in turn, may determine a maximum repetition rate R for the pulses 130, 140 of illumination. More specifically, the maximum repetition rate R usable at a particular altitude D may be described as follows: $R \leq c/(2*D)$.

Optical ranging, mapping and lidar systems, such as the system 100, may employ light sources 125 providing luminance at wavelengths having relatively high transmissivity in media through which the forward 130 and reflected 140 luminance propagates. In many applications, such as airborne or spaceborne planetary mapping systems, a wavelength of about one micrometer (in the infrared) may be useful, because this does not correspond to absorption peaks of atoms or molecules likely to constitute at least portions of the media (e.g., water vapor, methane etc.), while other wavelengths (such as one and one half micrometers) may not be favorable. Furthermore, a significant commercial infrastructure of optics, coatings, and detectors commonly used at wavelengths of around one micrometer exist for solid-state laser applications.

Additionally, ambient sources of radiation at or near the wavelength of the luminance 130, 140 employed for imaging or metrology purposes may provide significant interference. For example, solar radiation or reflected solar radiation (e.g., moonlight) may provide a time-varying luminance, resulting in an interfering signal that reduces dynamic range obtainable and hence tends to obscure the reflected luminance 140. As a result, data receivers 145 may often include a very narrow-band optical filter prior to any detector (such as a photodetector), in order to reduce the amount of interference from ambient sources. In turn, however, this can lead to problems, particularly when the frequency of the luminance from the imaging illumination source 125 fails to match the passband of the filter associated with the data receiver 145.

II. Optical System

Figure 2:
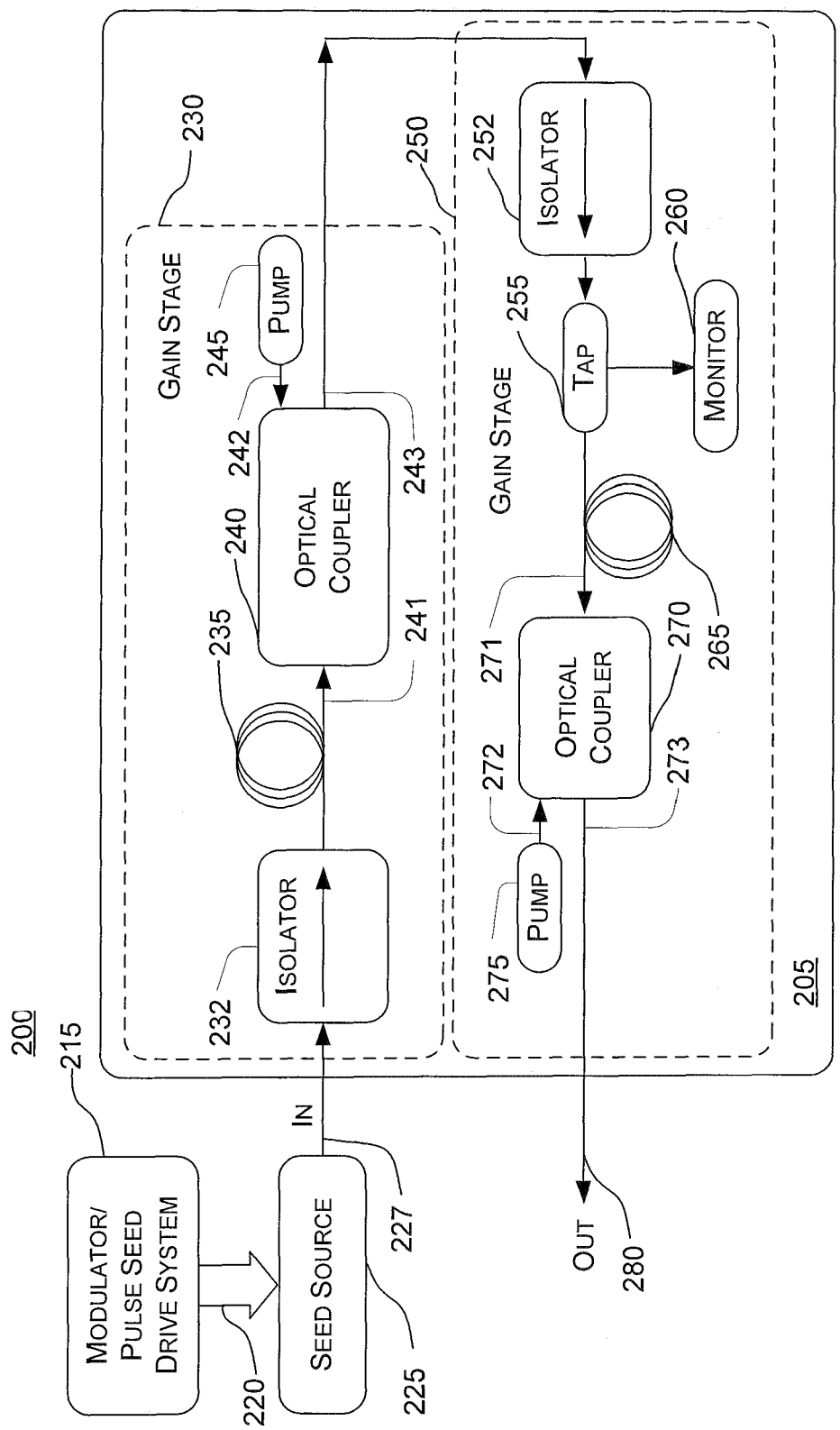
FIG. 2 shows a simplified block diagram of a fiber-based amplifier system as a portion of a coherent radiation source useful in the context of the system of FIG. 1.

FIG. 2 shows a simplified block diagram of a laser system 200 including an optical amplifier 205 that may be capable of use in the context of the system 100 of FIG. 1. The laser system 200 includes a modulator/pulse seed drive system 215, analogous to the modulator 115 of FIG. 1. An interconnection 220 may couple electrical signals from the modulator/pulse seed drive system 215 to a seed source 225, such as a semiconductor diode laser or other laser. The seed source 225 may provide an optical output signal to an input 227 IN to the optical amplifier 205.

In one embodiment, the optical amplifier 205 may include a first gain stage 230 having a first optical isolator 232 coupled to the input port 227 IN and thus to the seed source 225. The first optical isolator 232 may be coupled to a first optical fiber 235. The first optical fiber 235, in turn, may be coupled to a first optical coupler 240 via a first port, where the optical coupler may have a second 242 and a third 243 ports. The second port 242 of the first optical coupler 240 may convey optical energy from a first pump source 245 to the first optical fiber 235, and the third port 243 of the first optical coupler 240 may provide an output to the first gain stage 230 and may be coupled to a second gain stage 250.

A second optical isolator 252 forms an input to the second gain stage 250 and may be coupled to a tap 255 providing a capability for monitoring optical amplifier 205 operation via a monitor 260 that samples a small portion of the optical signal being transmitted through, and amplified via, the optical amplifier 205. Energy output from the second optical isolator 252/tap 255 may then be coupled to a second optical fiber 265. A second optical coupler 270 may be coupled to the second optical fiber 265 via a first port 271. The second optical coupler 270 may have a second port 272 and a third port 273. The second port 272 of the second optical coupler 270 is coupled to a second pump source 275, and the third port 273 may provide an output 280 OUT from second gain stage 250 and thus from the optical amplifier 205. Pulses from the output 280 OUT, in turn, may provide the luminance 130 of FIG. 1.

In one embodiment, elements comprising the optical amplifier 205 may be joined or coupled via interfaces between solid materials. One reason that such may find application in some arenas is known as the "fuse effect" whereby the optical fiber may be physically destroyed, much as a fuse burns, as a result of catastrophic failure at a single point, leading to localized, but traveling, absorption of optical energy with attendant thermal and other irreversible and extremely rapid degradation of the optical path.

As an example of low-loss optical inter-element coupling providing superior mechanical and thermal stability, conventional fusion splicing (e.g., using an electric arc to physically fuse two optical fibers together into a single, mechanically robust and very low optical loss unit) can provide an optical amplifier 205 having a primary optical path from the input 227 IN to the output 280 OUT formed as a single, continuous glass waveguide, that is, an optical amplifier 205 void of internal interfaces between components formed of solids and also void of any air or vacuum gaps, or gel-filled gaps, in the optical pathway. In other words, solid/gas, solid/liquid or solid/non-solid interfaces may be obviated in the optical amplifier 205, resulting in improved mechanical and thermal stability, as well as providing an optical amplifier 205 having extended useful life, due to the optical path being sealed and thus excluding contaminants or interfaces that can present infirmities, particularly when repeatedly exposed to high optical energy densities.

In one embodiment, the first and/or second couplers 240, 270 may be realized as wavelength division multiplexers readily commercially available. The first and/or second couplers 240, 270 may be realized as conventional tapered fiber bundles, available from a variety of sources (a tapered fiber bundle comprises at least one fiber forming a portion of the primary optical path and having at least a second fiber adjacent thereto, where the second fiber accepts optical energy from the associated pump source 245/275 and couples that energy into the first fiber via an evanescent wave). Tapered fiber bundles can provide relatively low cost, high efficiency couplers favoring manufacturing concerns.

Pump sources such as 245, 275 of FIG. 2 may be realized through commercially available laser diodes, where an optical fiber may be secured directly to the laser diode and the laser diode and diode-to-fiber junction are contained within a hermetically sealed, mechanically-robust enclosure. Taps such as tap 255 typically may couple a small amount of optical energy, such as 1% to 0.1%, from an optical wave traveling through the tap to a photodetector. It may be appreciated that while the optical amplifier 205 embodiment illustrated in FIG. 2 shows only one tap 255, many taps may be included along the optical path, for example for purposes of testing during manufacturing/calibration, and may be simply snipped off later, or may be employed for system monitoring, as suitable.

In one embodiment, the optical amplifier 205 may comprise a wavelength conversion apparatus that supplies optical pulses having energies that may range from levels below one nano-Joule up to at least 100 micro-Joules at the output 280 OUT, corresponding to amplified versions of the optical pulses injected via the seed source 225 through the input 227 IN. The embodiment of the optical amplifier 205 described with reference to FIG. 2 may be capable of gains of in excess of one hundred thousand.

The seed source 225 and the optical amplifier 205 are capable of providing output pulses having widths spanning a range of at least one hundred picoseconds to ten nanoseconds, at pulse repetition rates ranging from at least single-shot up to and exceeding one hundred kiloHertz. At pulse repetition rates above circa 10 kiloHertz, the pumps 245/275 may be operated in a continuous wave (CW) mode with energy levels and repetition rates high enough to avoid catastrophic failure via mechanisms such as amplified spontaneous emission.

In CW operation, the optical amplifier 205 may produce an optical output signal having an energy of one Watt or more, and, even when the modulator 115 is considered, provide an electrical-to-optical conversion efficiency of up to as much as 20% or more. This efficiency typically may be lowest at very low pulse repetition rates, and can be very high at higher pulse repetition rates, in part because the electrical power consumed by the modulation circuitry may be a smaller portion of the total electrical energy required at higher pulse repetition rates. The upper level laser lifetime of the Ytterbium ions in the gain fiber sections 230, 250 of the amplifier 205 retain stored pump energy that is not "swept" out by the injected low energy seed pulses. Thus, at higher repetition rates, leftover stored energy from the preceding pump pulse can be used to contribute to or increase the gain for next pulse. As the repetition rate increases from single shot to the kHz level, the net stored energy may increase, especially in the first gain stage 230.

In one embodiment, the optical amplifier 205 may include two optical gain stages 230 and 250, each providing a power gain of roughly ten to fifteen dB, although other numbers of optical gain stages may be employed. While the embodiment described with reference to FIG. 2 may employ optical fibers 235, 265 as broadband, high gain amplifier stages 230, 250, it may be appreciated that other forms of solid-state amplifiers may be employed, for example, analogous to titanium-sapphire-based elements, capable of providing gain/lasing from roughly 660 nanometers (red light) to about 1,100 nanometers (infrared) may be employed, as either gain stages, or as seeds.

In the laser system embodiment 200 of FIG. 2, the two gain stages 230 and 250 may comprise the first optical fiber 235 and the second optical fiber 265, respectively, that may be coupled together via the second optical isolator 252, and the first optical fiber 235 is coupled to the seed source 225 via the first optical isolator 232. The first 232 and second 252 optical isolators may comprise conventional fiber-based optical isolators that preclude a backwards wave from propagating from the second gain stage 250 to the first gain stage 230, or from the first gain stage 230 to the seed source 225. In turn, this helps to avoid problems such as amplified stimulated emission and other known sources of optical amplifier instability, by, among other things, dividing the gain among multiple stages. This arrangement also avoids inefficiency that may otherwise result from inability to extract optical pump energy that may be stored in, and then dissipated in, an initial portion of the optical amplifier 205 (corresponding to the first optical fiber 235 in this example).

In one embodiment, the seed source 225 may comprise a laser diode providing optical energy having a wavelength of about one micron, and which may be electrically tunable, for example, via a Bragg grating formed as a portion of a potassium titanyl phosphate (KTP) optical waveguide that may be coupled to the laser diode. Stable operation of the seed source 225 may be augmented via conventional thermoelectric cooling. Suitable diode lasers and electroptically-tunable gratings may be capable of supporting virtually any wavelength of optical energy in a range from about 970 nanometers to about 1080 nanometers, but with any one seed source 225 providing a tunability range of circa about ten to about twenty nanometers (e.g., plus or minus about five nanometers or more) via electronic adjustment of the electroptic gratings. Other semiconductor materials can be specified for these devices, and wavelengths ranging from about 650 nanometers through about 1500 nanometers may be available.

An advantage provided through this electronically adjustable wavelength diversity may be that the seed source 225 can be tuned in situ and in real time to match passband characteristics of the data receiver 145 of FIG. 1. In turn, this may provide a degree of flexibility when one or more elements of the system 100 or laser system 200 exhibits a change in operating characteristics, or to provide capability for distinguishing between signals from multiple seed sources 225 via use of multiple data receivers 145 each having different passbands.

It will be appreciated that while the embodiment of FIG. 2 has been described in terms of a single seed source 225 having a single wavelength of output signal, multiple seed sources 225 may be employed contemporaneously. For example, multiple seed sources 225 may be coupled via fiber couplers to a single optical amplifier 205, where the multiple seed sources 225 may have either the same or different wavelengths, but collectively falling within the frequency response of the optical amplifier 205, and the optical amplifier 205 may amplify optical signals from one or more of the seed sources 225 simultaneously. The seed source 225 described with respect to the embodiment of FIG. 2 may also provide capability for electrically tunable wavelength diversity via the electrooptic tunability feature described above, and may even provide pulse-to-pulse wavelength tunability, that is, can provide sequential optical pulses having different, electronically-controlled, wavelengths.

In one embodiment, the first 232 and second 252 optical isolators may comprise conventional fiber optic isolators, facilitating formation of the optical amplifier 205 without requiring any internal air-glass interfaces. In one embodiment, the optical amplifier 205 may comprise conventional first and second optical fibers 235 and 265 doped with rare earth elements, such as Ytterbium. It will be appreciated that the embodiment of FIG. 2 may be practiced, with suitable modifications, to encompass any optical frequency band for which suitably-doped fibers or waveguides providing gain may be available, coupled with suitable modifications of seed and pump elements. A variety of such fibers may be known and are conventional in the relevant arts.

In one embodiment, the first and second optical couplers 240 and 270 respectively may comprise wavelength division multiplexers. In one embodiment, the first and second pumps 245 and 275 each may comprise multiple solid state laser diodes whose output energies may be combined via conventional fiber coupling and may then be coupled into the respective associated first 240 or second 270 optical coupler. In one embodiment, the first 245 and second 275 pumps may provide optical energy having a wavelength of nine hundred fifteen nanometers, and the first and second optical couplers 240 and 270 may be configured to couple the nine hundred fifteen nanometer (915 nm) energy from the second ports 242 and 272 to the respective optical fiber 235, 265, while providing transparency at the first 241, 271 and third 243, 273 ports at the wavelength of the seed source 225.

Accordingly, the laser system 200 may form a closed, ruggedized pulsed optical source capable of providing coherent light pulses. As used herein, the term "ruggedized" may be defined to mean an optical amplifier system having an input-to-output optical path that may be formed as a substantially continuous solid waveguide.

The laser system 200, when employed in a system such as the system 100 of FIG. 1, may provide a pulsed coherent light source that achieves real-time agility by providing capability for electronically driven wavelength selection over a predetermined range. The embodiment described may also provide real-time electronic tunability, viz., variable pulse width, amplitude and repetition rate, without resulting in negative aspects such as beam pointing, degradation of optical beam quality or divergence. The pulse parameter agility and tunability may provide improvements over conventional light sources used in airborne metrology applications. Useful life of the laser system 200 may be increased relative to conventional CW systems, because, although the peak power output is relatively large, the average power level may be relatively low. This, coupled with the ruggedization aspects, may provide greatly increased useful life for the laser system 200, in comparison to conventional optical sources.

When the laser system 200 is provided in a system 100 configured, for example, for altimetry, terrain or vegetation mapping, etc., characteristics descriptive of system 100 performance in applications such as three-dimensional surface mapping, e.g., pixel size, cross-over density, data volume and surface image quality, may be increased by an order of magnitude, in comparison to conventional systems. Additionally, power budget, reliability and operational lifetime may be improved.

An illumination source capable of application in remote sensing, an imaging system based on such an illumination source and a mapping system capable of employing such an illumination source is described. Although specific embodiments have been illustrated and described herein, it will be appreciated by those of ordinary skill in the art that any arrangement which is calculated to achieve the same purpose may be substituted for the specific embodiments shown. This disclosure is intended to cover any adaptations or variations. For example, although described in procedural terms, one of ordinary skill in the art will appreciate that implementations can be made in a procedural design environment or any other design environment that provides the required relationships.

In particular, one of skill in the art will readily appreciate that the names or labels of the elements are not intended to limit embodiments. Furthermore, additional processes and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types. The terminology used in this disclosure is meant to include all alternate technologies which provide the same functionality as described herein.

What is claimed is:

1. A real-time space based planetary mapping measurement system for remote sensing and mapping comprising:
one or more processors; an illumination source controller and modulator coupled to one or more processors; a cavity free real-time electronically adjustable wavelength pulsed illumination source with multipower multiple laser lines coupled to the illumination source controller and modulator; a receiver having a capability for detecting illumination transmitted by the illumination source and providing signals based on detected illumination; the pulsed illumination source comprising: a seed coupled to the illumination source controller and modulator and accepting control and modulation signals therefrom; and an optical amplifier having an input coupled to the seed and having an output, the optical amplifier comprising two or more gain sections coupled to form a continuous solid waveguide along a primary optical path, each gain section comprising: an optical isolator forming an input to that gain section; a doped optical fiber having a first end coupled to the optical isolator and having a second end; a plurality of pump laser diodes; a controller providing drive signals to each of the plurality of pump laser diodes, the controller being configured to provide at least pulsed drive signals; and an optical coupler having a first input port coupled to the second end, a second input port coupled to said plurality of pump laser diodes and an output port.

2. The system of claim 1, wherein the optical amplifier comprises two or more gain sections forming a substantially physically continuous solid waveguide along a primary optical path.

3. The system of claim 1, wherein the seed comprises a laser diode.

4. The system of claim 1, wherein the seed comprises a laser diode having an output signal whose frequency is tunable in wavelength responsive to electrical signals.

5. The system of claim 1, wherein the seed comprises a laser diode having an output signal within a band of wavelengths spanning about 970 nanometers to about 1080 nanometers.

6. The system of claim 2, wherein the two or more gain sections are coupled via optical isolators.

7. The system of claim 1, wherein the substantially physically continuous solid waveguide includes optical fibers joined via fusion splicing.

8. The system of claim 2, wherein each of the two or more gain sections are backwards-wave pumped via a plurality of laser diode modules, each of the plurality comprising: an optical fiber; and a laser diode secured to the optical fiber, wherein the laser diode and diode-to-fiber junction are contained within a hermetically sealed, mechanically robust enclosure.

9. The system of claim 1 wherein an image reconstruction engine is coupled to the receiver and to one or more processors.

10. The system of claim 9 wherein the image reconstruction engine process signals from the receiver and employ characteristics of the signals to create a mapping corresponding to delay and reflectivity assessments based on the signals.

\* \* \* \* \*